United States Patent
Zhang et al.

(10) Patent No.: US 12,003,452 B2
(45) Date of Patent: Jun. 4, 2024

(54) PHASE TRACKING REFERENCE SIGNAL TRANSMISSION FOR PHYSICAL UPLINK SHARED CHANNEL RELIABILITY ENHANCEMENT

(71) Applicant: Apple Inc., Cupertino, CA (US)

(72) Inventors: Yushu Zhang, Beijing (CN); Wei Zeng, Saratoga, CA (US); Haitong Sun, Cupertino, CA (US); Dawei Zhang, Saratoga, CA (US); Hong He, San Jose, CA (US); Chunxuan Ye, San Diego, CA (US); Sigen Ye, Whitehouse Station, NJ (US); Weidong Yang, San Diego, CA (US); Huaning Niu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 240 days.

(21) Appl. No.: 17/439,377

(22) PCT Filed: Oct. 19, 2020

(86) PCT No.: PCT/CN2020/121835
§ 371 (c)(1),
(2) Date: Sep. 14, 2021

(87) PCT Pub. No.: WO2022/082351
PCT Pub. Date: Apr. 28, 2022

(65) Prior Publication Data
US 2022/0303097 A1    Sep. 22, 2022

(51) Int. Cl.
*H04L 5/00* (2006.01)
*H04L 27/26* (2006.01)
*H04W 72/1268* (2023.01)

(52) U.S. Cl.
CPC ........ *H04L 5/0051* (2013.01); *H04L 27/2675* (2013.01); *H04W 72/1268* (2013.01)

(58) Field of Classification Search
None
See application file for complete search history.

(56) References Cited

U.S. PATENT DOCUMENTS

| 11,121,838 B2 * | 9/2021 | Sun ........................ H04L 5/0048 |
| 11,122,514 B2 * | 9/2021 | Zhang ................... H04L 5/0048 |
| 11,303,339 B2 * | 4/2022 | Park ...................... H04L 1/0681 |
| 11,438,112 B2 * | 9/2022 | Jiang ..................... H04L 5/0051 |
| 11,456,905 B2 * | 9/2022 | Xi ......................... H04L 5/0053 |

(Continued)

FOREIGN PATENT DOCUMENTS

| CN | 111034306 | 4/2020 |
| WO | 2020192700 | 10/2020 |

OTHER PUBLICATIONS

International Patent Application No. PCT/CN2020/121835, International Preliminary Report on Patentability, dated May 4, 2023, 5 pages.

(Continued)

*Primary Examiner* — Faiyazkhan Ghafoerkhan
(74) *Attorney, Agent, or Firm* — Kilpatrick Townsend & Stockton LLP

(57) ABSTRACT

The present application relates to devices and components including apparatus, systems, and methods for physical uplink shared channel transmissions with repetitions on different transmit beams with phase tracking reference signals.

18 Claims, 11 Drawing Sheets

(56) References Cited

U.S. PATENT DOCUMENTS

| | | | | |
|---|---|---|---|---|
| 11,516,838 | B2* | 11/2022 | Taherzadeh Boroujeni | .................. H04L 1/189 |
| 11,588,602 | B2* | 2/2023 | MolavianJazi | ....... H04L 5/0048 |
| 2019/0182777 | A1* | 6/2019 | Zhang | .................. H04W 52/18 |
| 2019/0230683 | A1* | 7/2019 | Akkarakaran | .... H04W 72/1268 |
| 2020/0076557 | A1* | 3/2020 | Sun | ........................ H04L 5/0091 |
| 2020/0106559 | A1* | 4/2020 | Vilaipornsawai | ..... H04L 1/1896 |
| 2020/0146032 | A1* | 5/2020 | Bae | ....................... H04L 1/1819 |
| 2021/0014879 | A1* | 1/2021 | Bae | ..................... H04L 27/2607 |
| 2021/0044400 | A1* | 2/2021 | Jiang | .................... H04L 5/0048 |
| 2021/0044467 | A1* | 2/2021 | Xi | ......................... H04L 5/0007 |
| 2021/0068062 | A1* | 3/2021 | Yang | ........................ H04L 1/08 |
| 2021/0167925 | A1* | 6/2021 | Qi | ............................ H04L 5/005 |
| 2022/0217729 | A1* | 7/2022 | Kim | .................. H04W 72/1263 |
| 2022/0224472 | A1* | 7/2022 | Kim | ......................... H04B 7/06 |
| 2022/0303097 | A1* | 9/2022 | Zhang | ................. H04L 27/2675 |
| 2023/0085874 | A1* | 3/2023 | Khoshnevisan | ...... H04L 5/0048 370/329 |
| 2023/0216626 | A1* | 7/2023 | Muruganathan | .......... H04L 1/08 370/328 |

OTHER PUBLICATIONS

Multi-TRP enhancements for PDCCH, PUCCH and PUSCH, 3GPP TSG RAN WG1 Meeting #102-e e-Meeting R1-2005455, Source: ZTE, Aug. 17-28, 2020, 12 pages.

Remaining Issues on PUSCH Enhancements for NR URLLC, 3GPP TSG RAN WG1 #100bis e-Meeting, R1-2001613, Apr. 20-24, 2020, 15 pages.

International Patent Application No. PCT/CN2020/121835, International Search Report and Written Opinion, dated Jul. 15, 2021, 9 pages.

3rd Generation Partnership Project; Technical Specification Group Radio Access Network; NR; Multiplexing and channel coding (Release 16), 3GPP TS 38.212 V16.3.0, Sep. 2020, 152 pages.

3rd Generation Partnership Project; Technical Specification Group Radio Access Network; NR; Physical layer procedures for data (Release 16), 3GPP TS 38.214 V16.3.0, Sep. 2020, 167 pages.

3rd Generation Partnership Project; Technical Specification Group Radio Access Network; NR; Physical channels and modulation (Release 16), 3GPP TS 38.211 V16.3.0, Sep. 2020, 133 pages.

Clarification of PTRS port, 3GPP TSG-RAN WG1 Meeting #98bis, R1-1910867, Oct. 14-20, 2019, 4 pages.

Discussion on Enhancement on PDCCH, PUCCH, PUSCH in MTRP Scenario, 3GPP TSG RAN WG1 #102-e, R1-2005364, Aug. 17-28, 2020, pp. 1-13.

Discussion on MTRP for Reliability, 3GPP TSG RAN WG1 #102-e, R1-2006719, Aug. 17-28, 2020, 7 pages.

Discussion on multi-TRP/multi-Panel Transmission, 3GPP TSG RAN WG1 Meeting #102-e, R1-2006901, Aug. 17-28, 2020, 4 pages.

Enhancements on Multi-TRP for PDCCH, PUCCH AND PUSCH, 3GPP TSG RAN WG1 #102-e, R1-2006597, Aug. 17-28, 2020, 6 pages.

Summary of Enhanced UL Configured Grant Transmission for URLLC, 3GPP TSG RAN WG1 #100bis, R1-2002804, Apr. 20-30, 2020, pp. 1-26.

Japan Patent Application No. 2023-523651, Office Action, March 22, 2024, 10 pages.

Korea Patent Application No. 10-2023-7013323, Office Action, Mar. 4, 2024, 17 pages.

* cited by examiner

US 12,003,452 B2

PHASE TRACKING REFERENCE SIGNAL TRANSMISSION FOR PHYSICAL UPLINK SHARED CHANNEL RELIABILITY ENHANCEMENT

CROSS-REFERENCE TO RELATED APPLICATIONS

This application is a U.S. National Stage Application of PCT/CN2020/121835, filed Oct. 19, 2020. The disclosure of which is herein incorporated by reference in its entirety for all purposes.

BACKGROUND

A phase tracking reference signal (PTRS) may be associated with a physical uplink shared channel (PUSCH) to compensate phase offset for each symbol.

DETAILED DESCRIPTION

Figure 1:
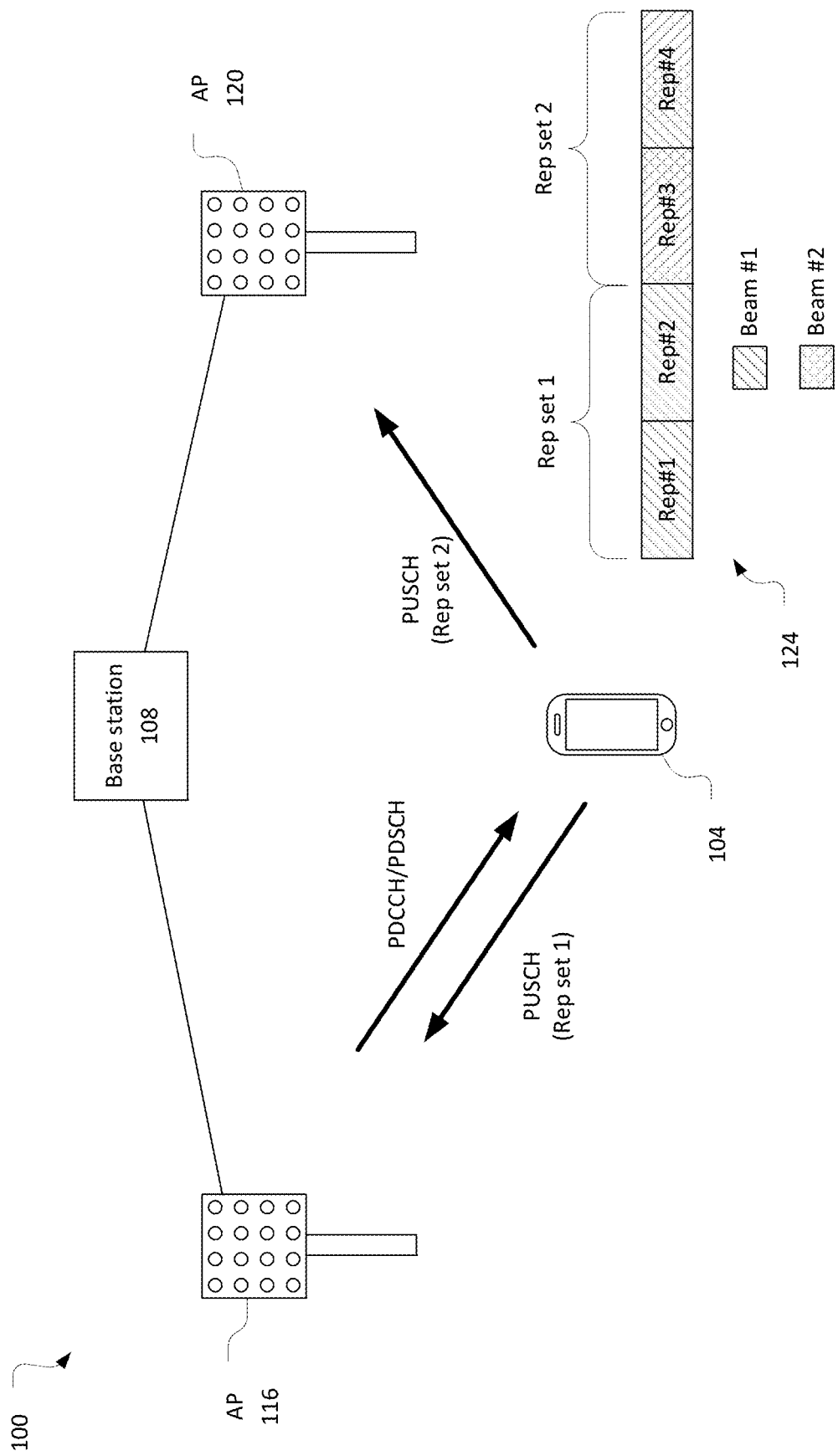
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

FIG. 1 illustrates a network environment 100 in accordance with some embodiments. The network environment 100 may include a UE 104 and a base station 108. The base station 108 may provide one or more wireless serving cells, for example, 3GPP New Radio "NR" cells, through which the UE 104 may communicate with the base station 108.

The UE 104 and the base station 108 may communicate over an air interface compatible with 3GPP technical specifications such as those that define Fifth Generation (5G) NR system standards. The base station 108 may be a next-generation-radio access network (NG-RAN) node that is coupled with a 5G core network. An NG-RAN node may be either a gNB to provide an NR user plane and control plane protocol terminations toward the UE 104 or an ng-eNB to provide evolved universal terrestrial radio access (E-UTRA) user plane and control plane protocol terminations toward the UE 104.

The base station 108 may be coupled with one or more distributed antenna panels (APs), for example, AP 116 and AP 120. The distributed APs 116/120 may be implemented in transmission-reception points (TRPs) or other devices. In general, the base station 108 may perform the majority of the operations of a communication protocol stack, including scheduling, while the APs 116/120 act as distributed antennas. In some embodiments, the APs 116/120 may perform some lower-level operations of the communication protocol stack (for example, analog physical (PHY) layer operations).

The base station 108 may use the APs 116/120 to geographically separate points at which a signal may be transmitted to, or received from, the UE 104. This may increase flexibility of using multiple-input, multiple-output and beamforming enhancements for communicating with the UE 104. The APs 116/120 may be used to transmit downlink transmissions to the UE 104 and receive uplink transmissions from the UE 104. In some embodiments, the distributed transmit/receive capabilities provided by the APs 116 and 120 may be used for coordinated multipoint or carrier aggregation systems from one or more base stations.

While the network environment 100 illustrates one base station 108 communicating with the UE 104 through APs 116/120, in various embodiments, the network environment 100 may include a number of other network elements (for example, base stations, TRPs, eNBs, etc.) to facilitate a radio access network connection for the UE 104. For example, in some embodiments, base station 108 may be locally coupled with AP 116 and another base station may be locally coupled with AP 120. The base station 108 may communicate with the other base station over an ideal or non-ideal backhaul to facilitate communications with the UE 104.

The base station 108 may transmit information (for example, data and control signaling) in the downlink direction by mapping logical channels on the transport channels, and transport channels onto physical channels. The logical channels may transfer data between a radio link control (RLC) and media access control (MAC) layers; the transport channels may transfer data between the MAC and PHY layers; and the physical channels may transfer information across the air interface.

The APs 116 and one or more antenna panels on the UE 104 may include arrays of antenna elements that allow receive or transmit beamforming. Beamforming may improve the uplink and downlink budgets by determining and using uplink and downlink beams that increase antenna gain and overall system performance. The UE 104 and the base station 108 may determine desired uplink-downlink beam pairs using beam management operations based on reference signal measurements and channel reciprocity assumptions.

In the downlink direction, the base station 108 may send synchronization signal blocks (SSBs) and channel state information-reference signals (CSI-RSs) that are measured by the UE 104 to determine the desired downlink beam pair for transmitting/receiving physical downlink control channel (PDCCH) and physical downlink shared channel (PDSCH) transmissions. In some embodiments, the network elements may assume uplink/downlink beam correspondence and use the desired downlink beam pair as the desired uplink beam pair for PUSCH and PUCCH transmissions. In some embodiments, beam pairs may be independently determined for the uplink direction based on sounding reference signals (SRSs) transmitted by the UE 104. In various embodiments, beam management may include different stages such as initial acquisition of the uplink and downlink beams, and later refinement of the uplink and downlink beams.

The PUSCH may be used to transfer user data in the user plane and signaling radio bearer (SRB) messages in the control plane. The PUSCH may also be used to transfer various control information such as, for example, buffer status reports, cell-radio network temporary identifiers (C-RNTIs), configured grant configuration, and power headroom reports.

The base station 108 may schedule a PUSCH transmission 124. The PUSCH transmission 124 may be scheduled with a plurality of repetitions that may be transmitted by one or more beams. Each repetition of the PUSCH transmission may carry the same transport block (TB) to increase reliability of the PUSCH transmission. Each repetition may be transmitted on one or more transmission layers using multiple input, multiple output (MIMO) techniques.

As shown, the PUSCH transmission 124 may include four repetitions, with repetition #1 and repetition #2 scheduled to be transmitted with beam #1 to AP 116, and repetition #3 and repetition #4 scheduled to be transmitted with beam #2 to AP 120. The repetitions may be grouped into repetition sets with each repetition set including a repetition having a similar beam configuration. For example, repetitions #1 and #2 may be included in repetition set 1, while repetitions #3 and #4 may be included in repetition set 2.

In some embodiments, the similar beam configurations may be determined based on the repetitions of a repetition set sharing SRS resource indicators (SRIs) or transmission precoder matrix indicators (TPMIs). A repetition set may include one or more repetitions.

The base station 108 may schedule the PUSCH transmission using dynamic grant (DG) or configured grant (CG). A PUSCH scheduled by dynamic grant (DG-PUSCH) may be scheduled by DCI in a PDCCH providing an individual resource allocation for the DG-PUSCH. The PUSCH scheduled by configured grant (CG-PUSCH) may be scheduled by the base station 108 configuring the UE 104 with a specific set of resource blocks that may be used for the CG-PUSCH. The control signaling for CG-PUSCH may include RRC signaling with or without Layer 1 (for example, PHY layer) signaling that acts as an activation trigger.

The UE 104 may transmit an uplink phase tracking reference signal (PTRS) with the PUSCH to allow the base station 108 to estimate and compensate for both phase noise and frequency offset that may be generated based on the operation of the oscillators at the transmitter and receiver. This may be especially prevalent in higher bands where there may be larger phase noise, which may lead to phase shift for different symbols.

Figure 2:
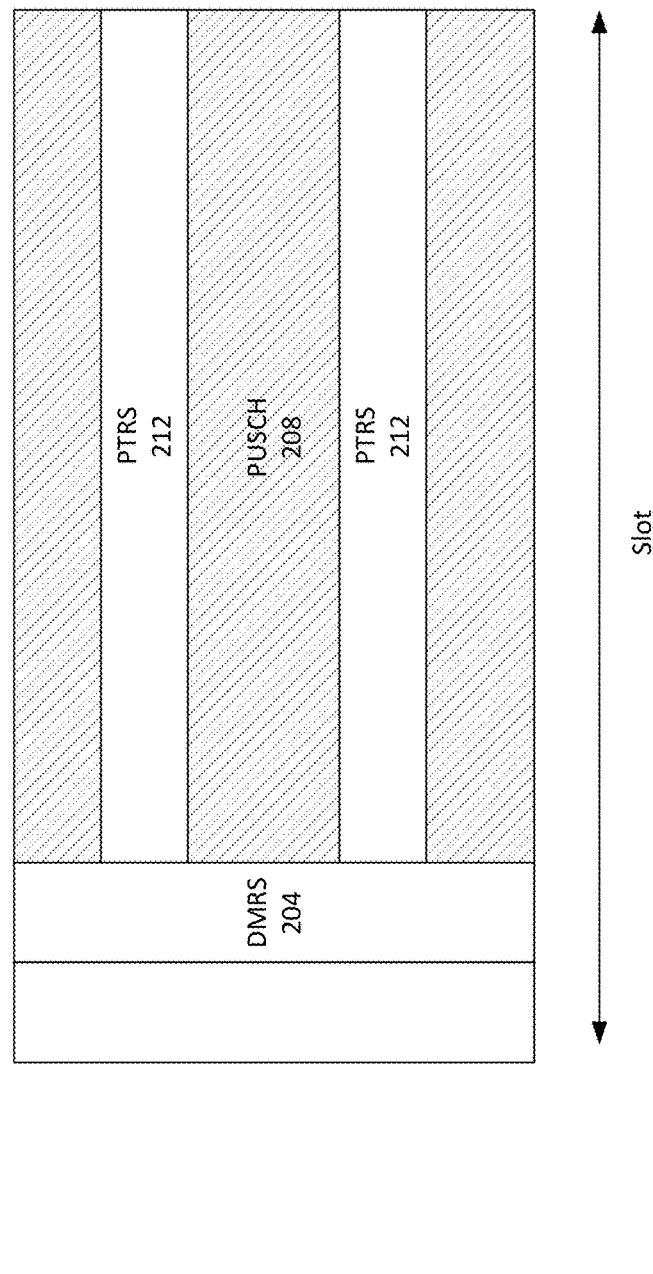
FIG. 2 illustrates a slot transmission in accordance with some embodiments.

FIG. 2 illustrates a slot transmission 200 in accordance with some embodiments. The slot transmission 200 may include a DMRS 204, a PUSCH transmission 208, and PTRSs 212. The PTRSs 212 may be inserted in orthogonal frequency division multiplexing (OFDM) symbols that do not include the DMRS 204. Phase noise may be change as a function of time more than as a function of frequency. Therefore, the PTRSs 212 may have a higher density in the time domain than in the frequency domain.

The base station 108 upon receiving the slot transmission 200 may compensate for phase noise impact and phase shift in the DMRS 204 assuming the DMRS 204 and the PTRS 212 are transmitted with the same precoder. In particular, the receiver of the base station 108 may compare phase shift between the PTRS 212 and the DMRS 204 to calculate the phase offset, which may be used to compensate for the phase shift for all the subcarriers of the DMRS 204.

In current versions of 3GPP technical specifications, up to two PTRS ports may be supported. Two PTRS ports may be desirable if the UE 104 includes multiple antenna panels, given that local oscillators associated with each panel may be separate sources of phase noise and frequency offset. The UE 104 may signaling its support for transmitting PTRS one or two antenna ports by a onePortsPTRS information element (IE) and twoPortsPTRS IE, respectively. The onePortsPTRS IE may indicate whether or not the UE supports one-port PTRS in Frequency Range 1 (410 MHz to 7125 MHz), as the UE 104 may be required to support one-port PTRS in Frequency Range 2 (24.25 GHz to 52.6 GHz).

Each PTRS port may be associated with a DMRS port, with the same digital precoder being applied for the PTRS and its associated DMRS. The two PTRS ports may be used for non-coherent/partial-coherent precoders.

The association between a PTRS port and a DMRS port may be provided through control signaling that provides the grant information. For example, for DG-PUSCH, the association between a PTRS and a DMRS port may be indicated by a DCI field PTRS-DMRS association with reference to Table 1 for one PTRS port and Table 2 for two PTRS ports. Table 1 corresponds to Table 7.3.1.1.2-25 of 3GPP TS 38.212 v16.3.0 (2020 September) and Table 2 corresponds to Table 7.3.1.1.2-26 of 3GPP TS 38.212.

TABLE 1

PTRS-DMRS association for UL PTRS port 0

| Value | DMRS port |
|---|---|
| 0 | $1^{st}$ scheduled DMRS port |
| 1 | $2^{nd}$ scheduled DMRS port |
| 2 | $3^{rd}$ scheduled DMRS port |
| 3 | $4^{th}$ scheduled DMRS port |

TABLE 2

PTRS-DMRS association for UL PTRS ports 0 and 1

| Value of MSB | DMRS port | Value of LSB | DMRS port |
|---|---|---|---|
| 0 | $1^{st}$ DMRS port which shares PTRS port 0 | 0 | $1^{st}$ DMRS port which shares PTRS port 1 |
| 1 | $2^{nd}$ DMRS port which shares PTRS port 0 | 1 | $2^{nd}$ DMRS port which shares PTRS port 1 |

For example, if one PTRS port is enabled, and value '0' is indicated in DCI, then, based on Table 1, the one PTRS port, e.g., PTRS port 0, is associated with the first scheduled DMRS port. Thus, the precoder for the PTRS may be the same as the first transmission layer, which may also be referred to as Layer 0.

If two PTRS ports are enabled and a bit value of '01' is indicated in DCI, then, based on Table 2, the PTRS port 0 is associated with the first transmission layer (based on most significant bit (MSB) value of '0') and PTRS port 1 is associated with the second transmission layer (based on least significant bit (LSB) value of '1')

The number of PTRS ports may be determined by RRC signaling and an indicated precoder (for example, TPMI) for a PUSCH transmission. When a PTRS is associated with PUSCH, 2 ports PTRS can be enabled when all of the following conditions are true: condition 1—maximum number of uplink PTRS ports are configured to be two in RRC;

condition 2—the codebook subset is configured to be non-coherent or partial coherent; and condition 3—PUSCH is transmitted by port 1000/1002 and port 1001/1003. For condition 3, ports 1000/1002 may be associated with a first antenna panel and ports 1001/1003 may be associated with a second antenna panel. Thus, condition 3 corresponds to a two-panel PUSCH transmission. Consider, for example, Table 3, which corresponds to an excerpt of Table 6.3.1.5-5 of 3GPP TS 38.211 v16.3.0 (2020 September).

TABLE 3

Precoding matrix W for two-layer transmission using four antenna ports with transform precoding disabled

| TPMI index | W (ordered from left to right in increasing order of TPMI index) | | | |
|---|---|---|---|---|
| 0-3 | $\frac{1}{2}\begin{bmatrix}1 & 0\\0 & 1\\0 & 0\\0 & 0\end{bmatrix}$ | $\frac{1}{2}\begin{bmatrix}1 & 0\\0 & 0\\0 & 1\\0 & 0\end{bmatrix}$ | $\frac{1}{2}\begin{bmatrix}1 & 0\\0 & 0\\0 & 0\\0 & 1\end{bmatrix}$ | $\frac{1}{2}\begin{bmatrix}0 & 0\\1 & 0\\0 & 1\\0 & 0\end{bmatrix}$ |
| 4-7 | $\frac{1}{2}\begin{bmatrix}0 & 0\\1 & 0\\0 & 0\\0 & 1\end{bmatrix}$ | $\frac{1}{2}\begin{bmatrix}0 & 0\\0 & 0\\1 & 0\\0 & 1\end{bmatrix}$ | $\frac{1}{2}\begin{bmatrix}1 & 0\\0 & 1\\1 & 0\\0 & -j\end{bmatrix}$ | $\frac{1}{2}\begin{bmatrix}1 & 0\\0 & 1\\1 & 0\\0 & j\end{bmatrix}$ |
| 8-11 | $\frac{1}{2}\begin{bmatrix}1 & 0\\0 & 1\\-j & 0\\0 & 1\end{bmatrix}$ | $\frac{1}{2}\begin{bmatrix}1 & 0\\0 & 1\\-j & 0\\0 & -1\end{bmatrix}$ | $\frac{1}{2}\begin{bmatrix}1 & 0\\0 & 1\\-1 & 0\\0 & -j\end{bmatrix}$ | $\frac{1}{2}\begin{bmatrix}1 & 0\\0 & 1\\-1 & 0\\0 & j\end{bmatrix}$ |
| 12-15 | $\frac{1}{2}\begin{bmatrix}1 & 0\\0 & 1\\j & 0\\0 & 1\end{bmatrix}$ | $\frac{1}{2}\begin{bmatrix}1 & 0\\0 & 1\\j & 0\\0 & -1\end{bmatrix}$ | $\frac{1}{2\sqrt{2}}\begin{bmatrix}1 & 1\\1 & 1\\1 & -1\\1 & -1\end{bmatrix}$ | $\frac{1}{2\sqrt{2}}\begin{bmatrix}1 & 1\\1 & 1\\j & -j\\j & -j\end{bmatrix}$ |

In this example, when TPMI=0, 2, 3, 5 for rank 2 and 4 ports codebook and UE reports that it supports 2 PTRS ports, the PUSCH may be scheduled with non-coherent or partial coherent precoders on ports 1000/1002 and ports 1001/1003 and, therefore, conditions 2 and 3 may be satisfied. Assuming condition 1 is also satisfied, two-port PTRS may be used.

If all three conditions are not satisfied, one port PTRS may be transmitted when PTRS is associated with PUSCH.

As discussed above with respect to FIG. 1, the PUSCH transmission 124 may include repetitions transmitted with different precoders. This may complicate the PTRS operation with respect to known techniques. Therefore, embodiments of the present disclosure describe how to determine a number of PTRS ports for each PUSCH repetition; and further describe how to determine the PTRS-to-DMRS association for each PUSCH repetition. In particular, embodiments describe PTRS transmission for PUSCH with repetitions from multiple beam/precoders. Some aspects include control signaling for a number of PTRS ports and PTRS-to-DMRS association indication. Additional aspects include UE behavior to determine number of PTRS ports and PTRS transmission characteristics.

Three options may be provided to determine a number of PTRS ports for each PUSCH repetition. These options are not mutually exclusive. Aspects of some of these options may be used with others.

A first option may include using only a single port PTRS port for PUSCH scheduled with repetitions with multiple beam/precoders. For example, even if the three conditions for using two port PTRS are satisfied (for example, maximum number of UL PTRS ports may be configured to be more than one; codebook subset is configured to be non-coherent/partial coherent, and two panel transmission is to be used), the UE 104 would still only apply one PTRS port. The UE 104 may transmit the PTRS through the one antenna port and that PTRS may be used for all the PUSCH repetitions. In various embodiments, a single PTRS port transmission may be transmitted in different antenna/panel in different repetition sets.

A second option may include using the same number of PTRS ports for all PUSCH repetitions. For example, an initial number of PTRS ports for each repetition (or repetitions set) may be determined based on a configuration set for the repetition or repetition set. The initial determination may be based on whether the configuration set (e.g., based on RRC signaling and indicated precoder for the repetition (or repetitions set)) satisfy the three conditions discussed above. For example, if, for a repetition (or repetition set), a maximum number of uplink PTRS ports are configured to be 2 in RRC; a codebook subset is configured to be non-coherent or partial coherent; and the repetition (or repetition set) is to be transmitted by port 1000/1002 and port 1001/1003, the repetition (or repetition set) may be initially determined to have two PTRS ports. Otherwise, one PTRS port may be initially determined for the repetition (or repetition set).

In some embodiments, a repetition (or repetition set) transmitted by port 1000/1002 and port 1001/1003 may be transmitted by one beam defined at the UE level, for example, beamforming weights applied to both antenna panels to form one beam. Alternatively, a repetition (or repetition set) transmitted by port 1000/1002 and port 1001/1003 may be transmitted by two beams defined at an antenna panel level.

Notwithstanding the initial determination, one number of PTRS ports may be selected to be used for all the PUSCH repetitions. Selecting the number to be used for all the PUSCH repetitions may be done as described with respect to one of the sub-options to follow.

Sub-option 2-1 may include determining the number of PTRS ports to use based on a number of PTRS ports initially determined for a particular PUSCH repetition. The PUSCH repetition may be, for example, the first PUSCH repetition (or repetition set); however, in other embodiments, it may be other PUSCH repetitions (or repetition set). Consider, for example, that it is initially determined that one PTRS port is to be used for repetition set 1 and two PTRS ports are to be used for repetition set 2. In sub-option 2-1, the UE 104 may determine that one PTRS port is to be used for both repetition sets 1 and 2.

Sub-option 2-2 may include determining the number of PTRS ports to use for all PUSCH repetitions (or repetition sets) based on a minimal number of PTRS ports across all PUSCH repetitions (repetition sets). Consider, for example, that it is initially determined that two PTRS ports are to be used for repetition set 1 and one PTRS port is to be used for repetition set 2. In sub-option 2-2, the UE 104 may determine that one PTRS port is to be used for both repetition sets 1 and 2.

Sub-option 2-3 may include determining the number of PTRS ports to use for all PUSCH repetitions (or repetition sets) based on a maximum number of PTRS ports across all PUSCH repetitions (or repetition sets). Consider, for example, that it is initially determined that two PTRS ports are to be used for repetition set 1 and one PTRS port is to be used for repetition set 2. In sub-option 2-3, the UE 104 may determine that two PTRS ports are to be used for both repetition sets 1 and 2.

Sub-option 2-4 may include implementing a scheduling restriction in which the base station 108 scheduling should result in a same number of PTRS ports for each PUSCH repetition. For example, the base station 108 may schedule the PUSCH transmission 124 in a manner in which a same number of PTRS ports, for example, either 1 PTRS port or two PTRS ports, are initially determined for repetition sets 1 and 2. It may be considered an error in this embodiment if the repetition sets are scheduled in a manner such that a different number of PTRS ports are determined for the different repetition sets.

In some embodiments, the base station 108 may restrict scheduling variations between repetition sets in order to ensure that a same number of PTRS ports are determined for the different repetition sets. For example, if the base station 108 schedules repetition set 1 in a manner to satisfy the three conditions for 2 PTRS ports, it must also schedule repetition set 2 in manner to satisfy the three conditions for 2 PTRS ports. It will be understood that there may still be some scheduling variation between the two repetition sets. For example, the first repetition set may be scheduled with a first precoder while the second repetition set is scheduled with the second precoder, as long as both the first precoder in the second precoder are non-coherent or partial coherent precoders (and, therefore, satisfy condition 2).

A third option for determining the number of PTRS ports for each PUSCH repetition (or repetition set) may include determining the number of PTRS ports individually for each PUSCH repetition (or repetition set). For example, for each PUSCH repetition (or repetition set), it may be determined whether the RRC signaling and precoder satisfy the three conditions. For example, it may be determined whether: a maximum number of uplink PTRS ports are configured to be 2 in RRC; codebook subset is configured to be non-coherent or partial coherent; and the PUSCH repetition (or repetition set) is to be transmitted by port 1000/1002 and port 1001/1003. If so, two PTRS ports may be applied to the PUSCH repetition (or repetition set). Otherwise, one PTRS port may be used for the repetition (or repetition set). It may be noted that the PUSCH repetition may indicate actual or nominal PUSCH repetition.

Three options may be provided to determine a PTRS-to-DMRS association for DG-PUSCH transmissions with repetitions. These options are not mutually exclusive. Aspects of some of these options may be used with others.

A first option may include determining PTRS-to DMRS association for each PUSCH repetition (or repetition set, e.g., PUSCH repetitions with the same precoder/beam) based on an indicator provided by single DCI. This may be performed in accordance with at least two sub-options.

In sub-option 1-1, a single DCI field may be used to jointly configure the PTRS-to-DMRS association for each repetition (or repetition set). In some embodiments, the single DCI field may refer to a preconfigured table of values that will correspond to the different repetitions (or repetition sets). Consider, for example, Table 4, which associates UL PTRS port 0 to either a first scheduled DMRS port or a second scheduled DMRS port for first and second PUSCH repetition sets. The repetition sets, in this embodiment, are defined as repetitions sharing a first SRI/TPMI and repetitions sharing a second SRI/TPMI.

TABLE 4

PTRS-to-DMRS association for UL PTRS port 0

| Value | DMRS port for PUSCH repetitions sharing 1$^{st}$ SRI/TPMI | DMRS port for PUSCH repetitions sharing the 2$^{nd}$ SRI/TPMI |
|---|---|---|
| 0 | 1$^{st}$ scheduled DMRS port | 1$^{st}$ scheduled DMRS port |
| 1 | 2$^{nd}$ scheduled DMRS port | 1$^{st}$ scheduled DMRS port |
| 2 | 1$^{st}$ scheduled DMRS port | 2$^{nd}$ scheduled DMRS port |
| 3 | 2$^{nd}$ scheduled DMRS port | 2$^{nd}$ scheduled DMRS port |

For example, if a DCI field provides an indication of value '1,' the DMRS port for the first repetition set will be the second scheduled DMRS port (for example, transmission layer 1); and the DMRS port for the first repetition set will be the first scheduled DMRS port (for example, transmission layer 0). PTRS port 0 will, therefore, be associated with both the first and second scheduled DMRS ports. Thus, a PTRS transmitted from PTRS port 0 will use the same precoder as a DMRS transmitted with the first repetition set via transmission layer 0 and as a DMRS transmitted with the second repetition set via transmission layer 1.

In some embodiments, a maximum number of layers for each PUSCH repetition (or repetition set) may be restricted to reduce overhead. For example, in some embodiments, up to two transmission layers may be allowed (e.g., two precoders/beams can be applied across PUSCH repetitions). This may allow 2-bit PTRS-to-DMRS association field to be used with reference to a PTRS-DMRS association table (such as Table 4) for one PTRS port indication.

In sub-option 1-2, multiple DCI fields may be used to configure the PTRS-to-DMRS association for each repetition (or repetition set). For example, assuming two repetition sets are to be transmitted, a first DCI field may indicate a first association value that references a PTRS-DMRS association table (such as Table 1) for the first repetition set; and a second DCI field may indicate a second association value that references the PTRS-DMRS association table for the second repetition set.

In a second option for determining a PTRS-to-DMRS association for DG-PUSCH with repetitions with multiple precoders/beams, the PTRS DMRS association may not be based on DCI. For example, the association may not be indicated in DCI or, if indicated, may be ignored by the UE 104. This may be performed in accordance with at least two sub-options.

In option 2-1, the PTRS-to-DMRS association may be based on a predefined value of PTRS-to-DMRS association. For example, one association value may be assumed as the default PTRS-to-DMRS association to apply. For example, the UE 104 may determine that the PTRS is always associated with the first DMRS port, for example, the PTRS-to-DMRS association value is 0, with respect to any of Tables 1, 2, or 4.

In option 2-2, the PTRS-to-DMRS association may be configured by higher-layer signaling, for example, RRC or MAC CE. In this manner, the association value may be updated based on specific configuration scenarios. However, the rate at which the association value would be updated may be less than that of a dynamic signaling through DCI as discussed above.

In option 2-3, the PTRS-to-DMRS association may be based on a per-precoder port cycling in which the association is based on the number of DMRS ports and a repetition number within a repetition set. In particular, in accordance with some embodiments, the association may be determined by a number of associated DMRS ports (N) and repetition index (k) among the repetitions of a repetition set (for example, that share the same precoder/beam). For example, a first repetition of a repetition set may have a k value of 0, a second repetition of a repetition set may have a value of 1, and so on. The PTRS port 0 may then be associated with the DMRS port k mod N.

Figure 3:
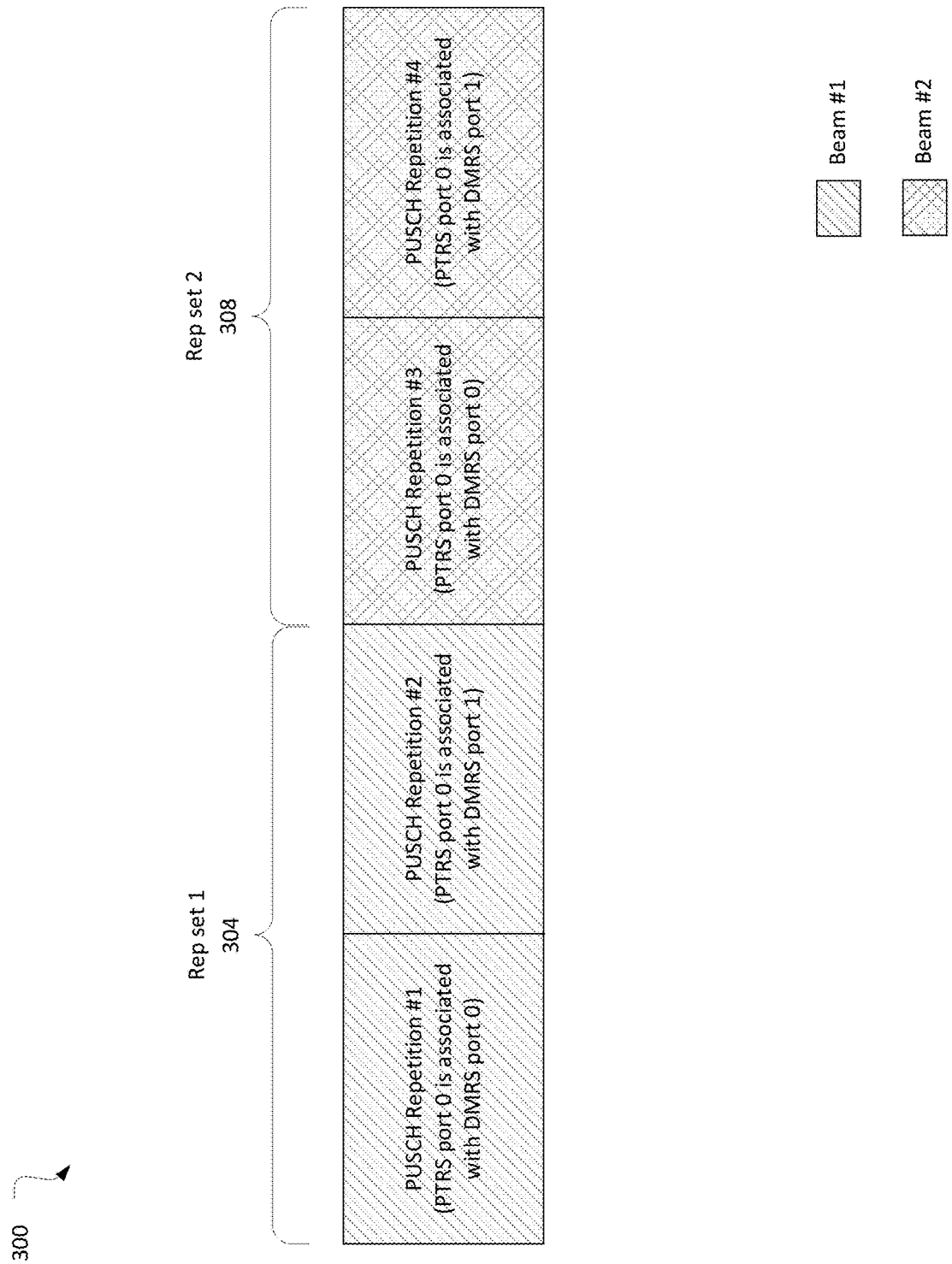
FIG. 3 illustrates a signaling diagram in accordance with some embodiments.

Consider, for example, a signaling diagram 300 of FIG. 3 in accordance with some embodiments. Similar to the PUSCH transmission of FIG. 1, the signaling diagram 300 may include a PUSCH transmission 300 including a first repetition set 304 that includes PUSCH repetition #1 and PUSCH repetition #2. PUSCH transmission 300 may further include a second repetition set 308 that includes PUSCH repetition #3 and PUSCH repetition #4. The first repetition set 304 may be transmitted by beam #1 and the second repetition set 308 may be transmitted by beam #2.

Assuming one PTRS port is enabled, the port cycling of option 2-3 may result in: PUSCH repetition #1 being transmitted on a first transmission layer (with PTRS port 0 being associated with DMRS port 0 (based on k=0 and N=2)); PUSCH repetition #2 being transmitted on a second transmission layer (with PTRS port 0 being associated with DMRS port 1 (based on k=1 and N=2)); PUSCH repetition #3 being transmitted on the first transmission layer, (with PTRS port 0 again being associated with DMRS port 0 (based on k=0 and N=2)); and PUSCH repetition #4 being transmitted on the second transmission layer (with PTRS port 0 being associated with DMRS port 1 (based on k=1 and N=2)).

In a third option for determining a PTRS-to-DMRS association for DG-PUSCH with repetitions with multiple precoders/beams, for DG-PUSCH, the PTRS-to-DMRS association for PUSCH repetitions other than the first PUSCH repetition or PUSCH repetitions with the different precoder/beam from the first PUSCH repetition can be indicated by a second stage DCI.

Figure 4:
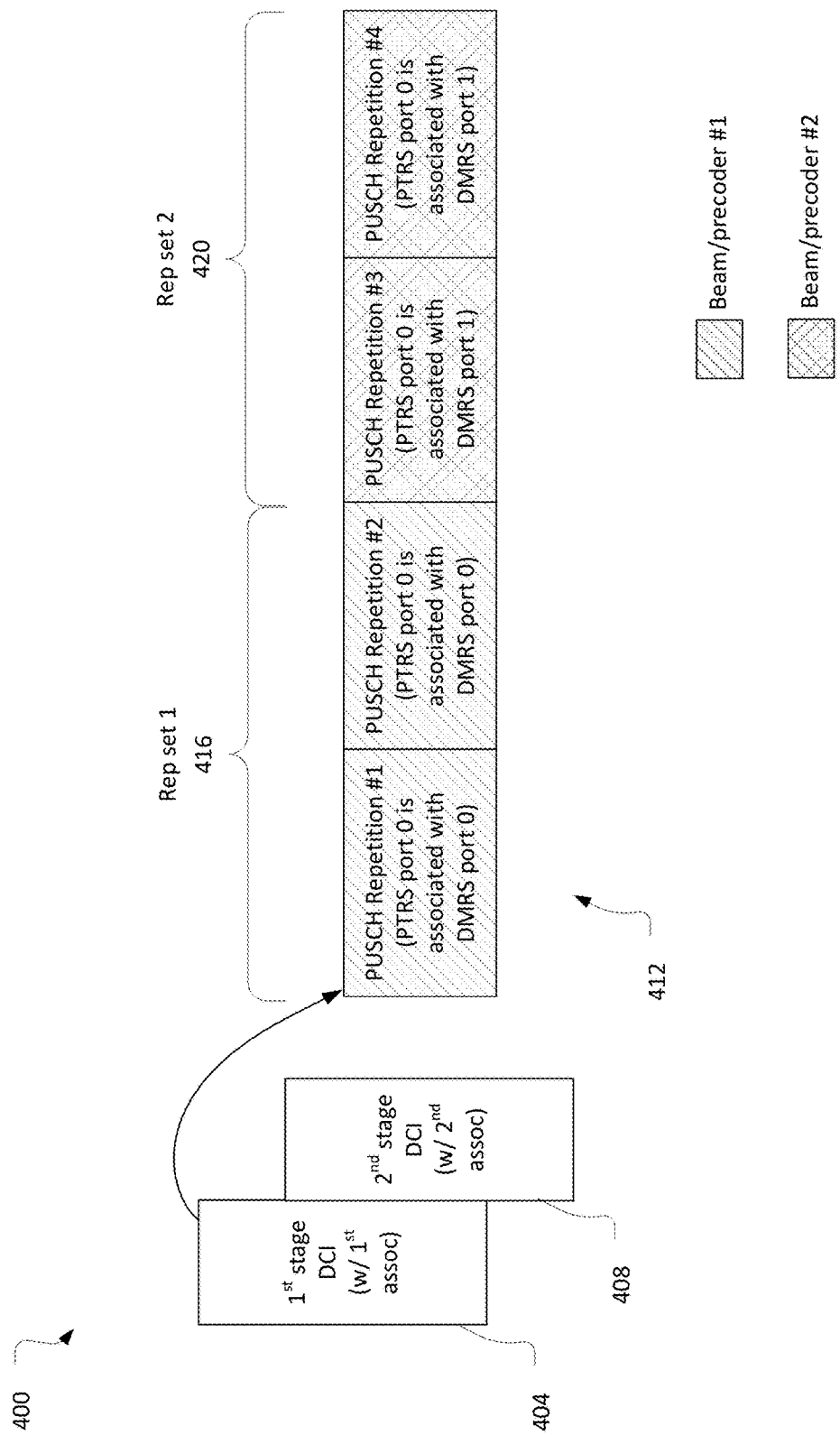
FIG. 4 illustrates another signaling diagram in accordance with some embodiments.

FIG. 4 illustrates a signaling diagram 400 with a second-stage indication of the PTRS-to-DMRS association in accordance with some embodiments. The signaling diagram includes first stage DCI 404 and second stage DCI 408. The first stage DCI 404 may schedule a DG-PUSCH transmission 412. The DG-PUSCH transmission 412 may include a first repetition set 416 with PUSCH repetitions #1 and #2 and a second repetition set 420 with PUSCH repetitions #3 and #4.

The first stage DCI 404 may provide the dynamic grant for the DG-PUSCH transmission 412. Additionally, the first stage DCI 404 may provide the PTRS-to-DMRS association for the first repetition set. In this embodiment, the association may indicate that the PTRS port 0 is associated with DMRS port 0. Thus, the first repetition set 416 may be transmitted by the first transmission layer. In some embodiments, the first stage DCI may also provide an indication of, and possibly a location of, the second stage DCI 408.

The second stage DCI 408 may provide the indication for the PTRS-to-DMRS association for the repetition sets that follow the first repetition set. For example, the second stage DCI 408 may indicate that the PTRS port 0 is associated with DMRS port 1 for the second repetition set 420. Thus, the second repetition set 420 may be transmitted by the second transmission layer.

In some embodiments, the first stage DCI 404 may provide the dynamic grant for the DG-PUSCH 412, while the second stage DCI 408 provides the indication for the PTRS-to-DMRS association for all the repetition sets.

In some embodiments, the bit width in the second stage DCI 408 may be adapted based on the scheduling of the first stage DCI 404. The scheduling of the DG-PUSCH 412 may result in a smaller subset of values of a PTRS-DMRS association table that are valid and need to be referenced. For example, if one port PTRS is used with only two transmission layers, only one bit may be needed to provide the indication of the PTRS-to-DMRS association. In some embodiments the bit width for the PTRS-DMRS indication in the second stage DCI 408 can be determined by the number PTRS ports M and number of layers N. For example, the bit width could be log 2(ceil(N/M))*M.

For CG-PUSCH with repetitions from multiple beam/precoders, the base station 108 may configure different PTRS-to-DMRS associations for each repetitions (or repetition sets) by RRC signaling. Two options are provided below to configure port associations using RRC signaling. These options are not mutually exclusive. Aspects of one of these options may be used with the other.

In a first option, RRC parameters can be introduced to configure PTRS-to-DMRS association for PUSCH repetitions. It may be jointly indicated by a single RRC parameter or a PTRS-to-DMRS association list. For example, if the CG-PUSCH is scheduled with two transmission layers and one PTRS port, the RRC parameter may indicate whether the PTRS port is associated with a first or second scheduled DMRS port for each of a plurality of repetition sets of the CG-PUSCH.

In a second option, an RRC parameter can be introduced to enable PTRS port cycling. When enabled, the UE 104 may use an approach similar to that described above with respect to option 2-3 and FIG. 4.

In some embodiments, the RRC parameters used to configure the port association may be included in the RRC signaling that is used to provide the configured grant for the CG-PUSCH. Additionally/alternatively, the RRC parameters may be provided in an update to the configured grant.

Figure 5:
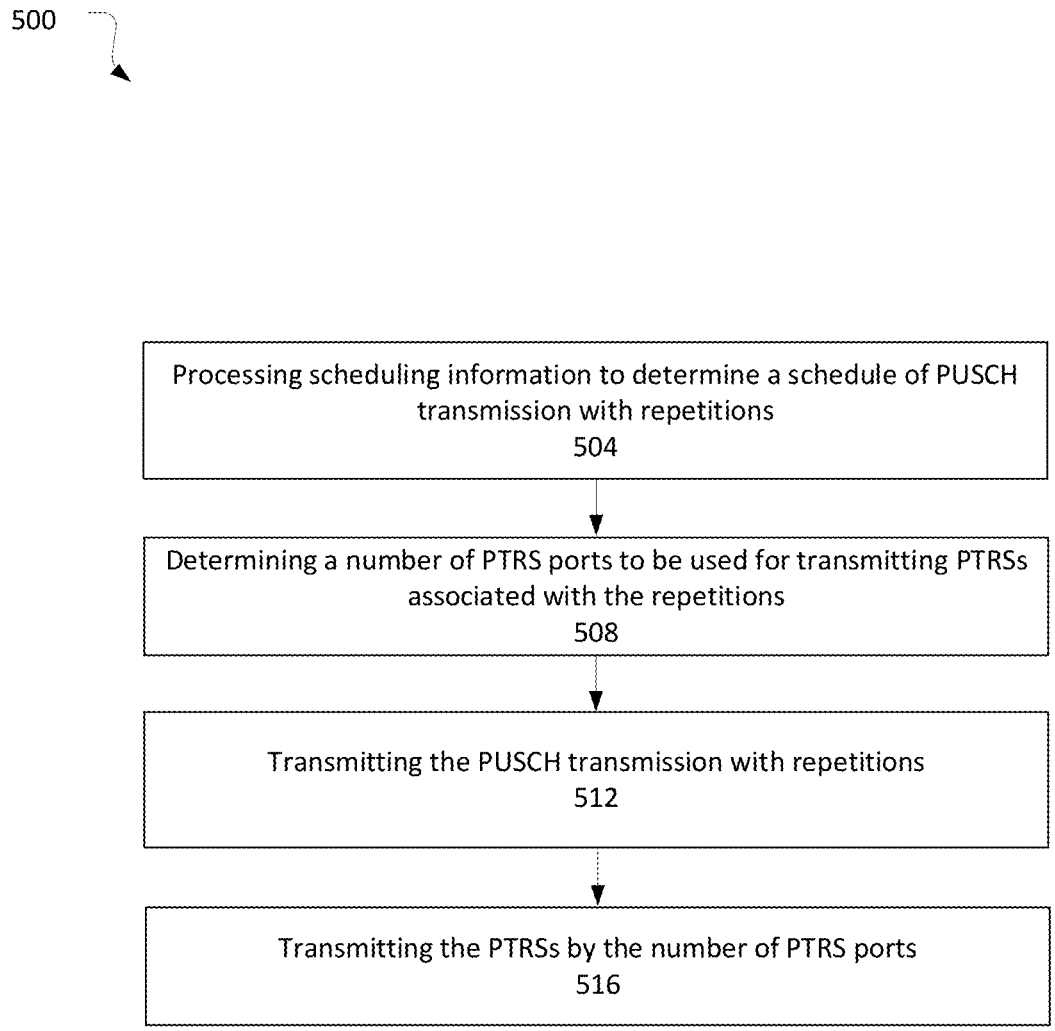
FIG. 5 illustrates an operational flow/algorithmic structure in accordance with some embodiments.

FIG. 5 illustrates an operation flow/algorithmic structure 500 in accordance with some embodiments. The operation flow/algorithmic structure 500 may be performed or implemented by a UE such as, for example, UE 104 or UE 1000; or components thereof, for example, baseband processor 1004A.

The operation flow/algorithmic structure 500 may include, at 504, processing scheduling information to determine a schedule of PUSCH transmissions with repetitions. In some embodiments, the scheduling information may be dynamic grant scheduling information transmitted by DCI. In other embodiments, the scheduling information may be configured grant scheduling information transmitted by RRC and, optionally, DCI.

The repetitions of the PUSCH transmission may be grouped into a plurality of repetition sets scheduled to be transmitted on a respective plurality of transmit beams. The scheduling of the repetition sets on respective transmit beams may be based on common SRI or TPMI configurations for the repetitions of a repetition set. A repetition set may include one or more repetitions. The repetition sets may include different numbers of repetitions.

The operation flow/algorithmic structure 500 may further include, at 508, determining a number of PTRS ports to be used for transmitting PTRSs associated with repetitions. The number of PTRS ports may be determined to be the same for all the repetition sets, or different.

In one embodiment, an initial number of PTRS ports may be determined for each repetition set. The initial number may be determined based on whether a configuration set for a particular repetition set satisfies the three conditions discussed above (for example, maximum number of uplink PTRS ports configured to be two; codebook subset is configured to be non-coherent or partial coherent; and repetition set is to be transmitted by port 1000/1002 and port 1001/1003). In some embodiments, one of the initial numbers may be used for all the repetition sets. The initial number may be the number associated with the first repetition set, a largest of the initial numbers, or a smallest of the initial numbers. In other embodiments, initial numbers may be used for transmitting respective repetition set.

The operation flow/algorithmic structure 500 may further include, at 512, transmitting the PUSCH transmission with repetitions. The PUSCH transmission may be transmitted with the transmit beams as configured by the dynamic grant or configured grant.

The operation flow/algorithmic structure 500 may further include, at 516, transmitting the PTRSs by the number of PTRS ports determined at 508.

Figure 6:
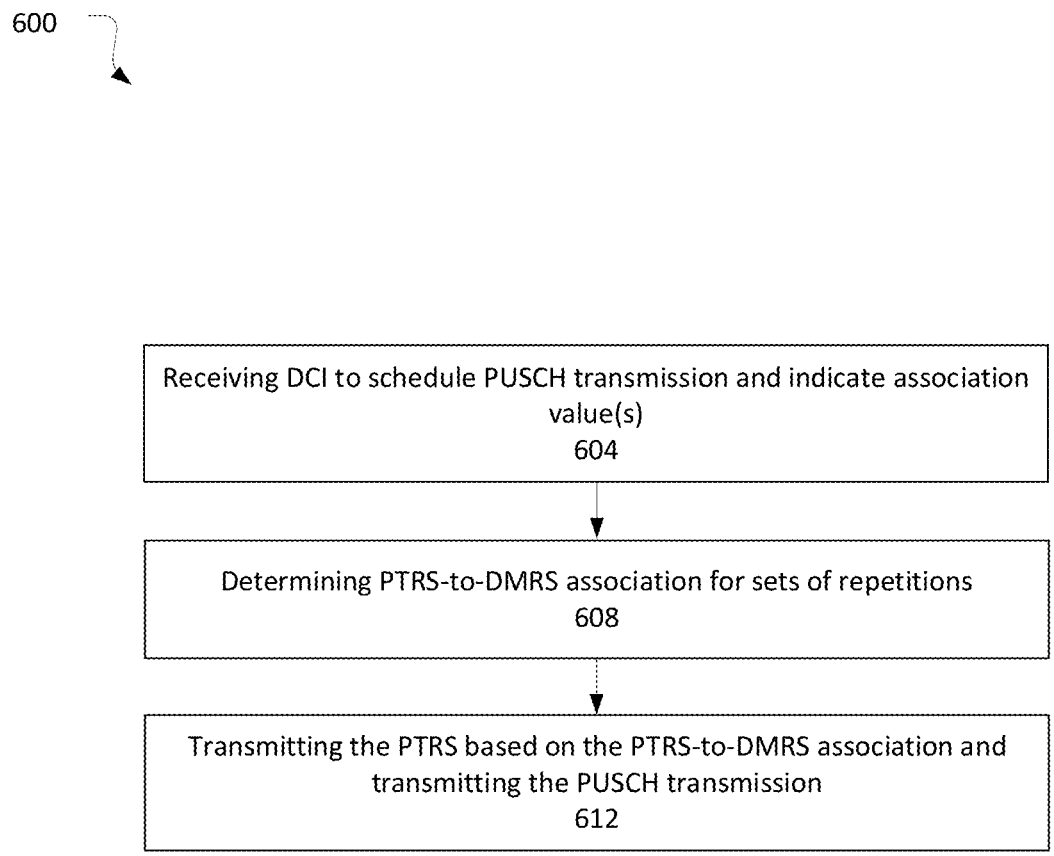
FIG. 6 illustrates another operational flow/algorithmic structure in accordance with some embodiments.

FIG. 6 illustrates an operation flow/algorithmic structure 600 in accordance with some embodiments. The operation flow/algorithmic structure 600 may be performed or implemented by a UE such as, for example, UE 104 or UE 1000; or components thereof, for example, baseband processor 1004A.

The operation flow/algorithmic structure 600 may include, at 604, receiving one or more DCI to schedule PUSCH transmission and indicate association value. The PUSCH transmission in this embodiment may be a DG-PUSCH with a plurality of repetitions sets. Each repetition set may include one or more repetitions that share a SRI/TPMI.

The one or more DCI may include the indications of the association values in one or more fields. For example, in a first embodiment, a single DCI field may be used to jointly configure the associations for each repetition set. In another embodiment, a plurality of DCI fields may be used to individually configure associations for a respective plurality of repetition sets.

In some embodiments, the one or more DCI may include a first stage DCI that includes scheduling information and a second stage DCI that includes the association information. In some embodiments the first stage DCI may include association information for the first repetition set, while the second stage DCI includes association information for the second repetition set. In other embodiments, the second stage DCI may include the association information for all the repetitions sets.

The operation flow/algorithmic structure 600 may further include, at 608, determining PTRS-to-DMRS associations for the repetition sets. In particular, one or more PTRS ports may be associated with one or more scheduled DMRS ports. These associations may be determined by using the association information to reference one or more stored PTRS-DMRS tables such as, for example, Table 1, Table 2, or Table 4 as described herein.

The operation flow/algorithmic structure 600 may further include, at 612, transmitting the PTRS based on the association and transmitting the PUSCH transmission. The PTRSs may be transmitted with the same precoders used for the associated DMRS, which is transmitted with a respective repetition set.

Figure 7:
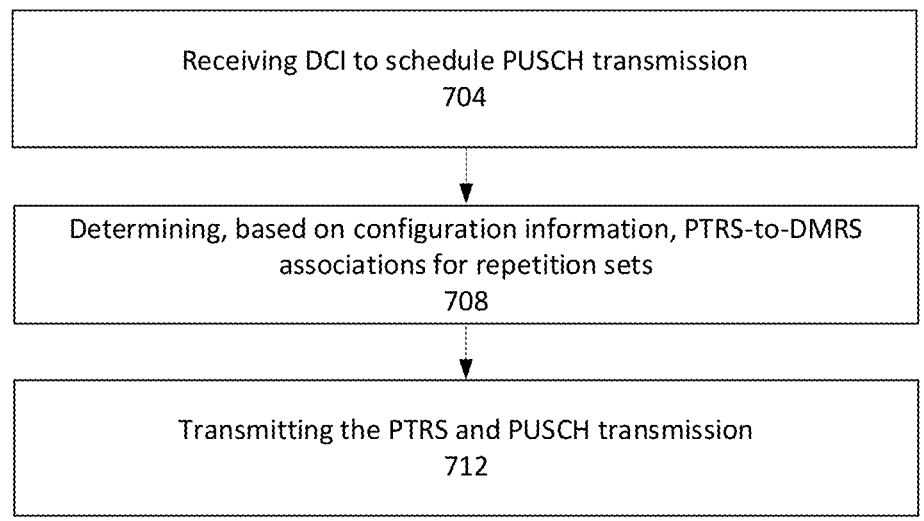
FIG. 7 illustrates another operational flow/algorithmic structure in accordance with some embodiments.

FIG. 7 may include an operation flow/algorithmic structure 700 in accordance with some embodiments. The operation flow/algorithmic structure 700 may be performed or implemented by a UE such as, for example, UE 104 or 1000; or components thereof, for example, baseband processor 1004A.

The operation flow/algorithmic structure 700 may include, at 704, receiving DCI to schedule PUSCH transmission. In this embodiment, the PUSCH transmission may be a DG-PUSCH scheduled by DCI similar to that described above.

The operation flow/algorithmic structure 700 may further include, at 708, determining, based on configuration information, PTRS-to-DMRS associations for repetition sets. In this embodiment, the configuration information may be predefined or received from higher-layer signaling. Higher-layer signaling as used herein, may refer to signaling above the physical layer. For example, the higher-layer signaling may include RRC signaling or MAC control signaling (for example, a MAC CE).

If the DCI includes association information it may be discarded or otherwise ignored by the UE.

In some embodiments, the configuration information may indicate that the PTRS-to-DMRS association is based on a predefined value. This predefined value may be with reference to a PTRS-DMRS tables such as that described above with respect to Table 1, Table 2, or Table 3. This predefined value may be a static value that is used as a default value in the event no other association information is configured by, for example higher layer signaling.

In some embodiments, configuration information may indicate that the PTRS-to-DMRS association is to be based on PTRS port cycling. For example, if the DG-PUSCH transmission is associated with N DMRS ports, where N is an integer, the PTRS-to-DMRS association may be determined for each repetition of a repetition set based on a repetition index (k) among the one or more repetitions. For example, a PTRS port may be associated with DMRS port k mod N. In this embodiment, k=0 for a first repetition of particular repetition set and is incremented by one for subsequent repetitions of the repetition set. The value k may be reset to 0 when determining associations for repetitions in a subsequent repetition set.

The operation flow/algorithmic structure 700 may further include, at 712, transmitting the PTRS and the PUSCH transmission. As discussed above, the PTRS may be transmitted with the same precoder as its associated DMRS.

Figure 8:
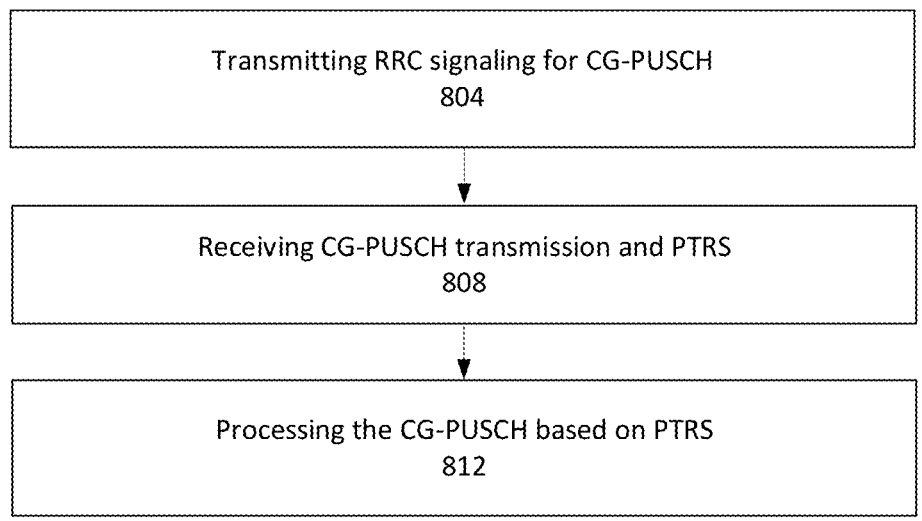
FIG. 8 illustrates another operational flow/algorithmic structure in accordance with some embodiments.

FIG. 8 may include an operation flow/algorithmic structure 800 in accordance with some embodiments. The operation flow/algorithmic structure 800 may be performed or implemented by a base station such as, for example, base station 108 or gNB 1100; or components thereof, for example, baseband processor 1104A.

The operation flow/algorithmic structure 800 may include, at 804, transmitting RRC signaling for CG-PUSCH. The CG-PUSCH may be a Type 1 configured grant (fully configured by RRC signaling) or a Type 2 configured grant (configured by RRC signaling and subsequently triggered by a DCI transmission).

In some embodiments, in addition to the configured grant information, the RRC signaling may include association information to configure different PTRS-to-DMRS associations for individual repetition sets. In some embodiments, the association information may be included in one or more RRC parameters or association lists. In some embodiments, the association information may enable, trigger, or reconfigure PTRS port cycling to be used by the receiving UE.

The operation flow/algorithmic structure 800 may further include, at 808, receiving a CG-PUSCH transmission and PTRS. The CG-PUSCH transmission and PTRS may be transmitted by the UE based on the scheduling and association information provided through the RRC signaling of 804.

The operation flow/algorithmic structure 800 may further include, at 812, processing the CG-PUSCH based on the PTRS. In particular, the base station may determine a phase shift based on the PTRS and may use the determine phase shift for processing a DMRS associated with the PTRS. In this manner, the base station may then demodulate the PUSCH repetitions based on the recovered DMRS.

Figure 9:
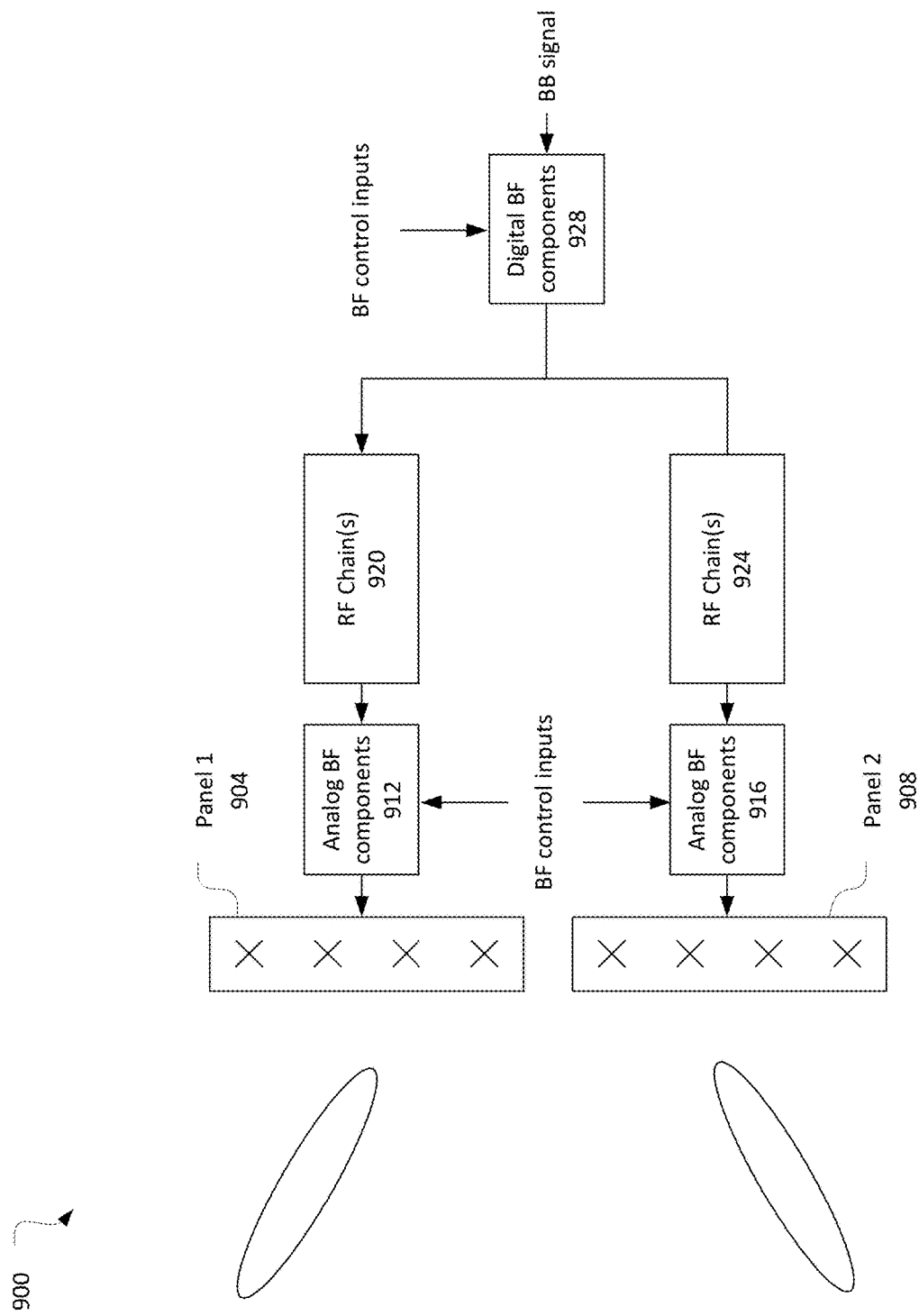
FIG. 9 illustrates beamforming components of a device in accordance with some embodiments.

FIG. 9 illustrates beamforming circuitry 900 in accordance with some embodiments. The beamforming circuitry 900 may include a first antenna panel, panel 1 1004, and a second antenna panel, panel 2 908. Each antenna panel may include a number of antenna elements. Other embodiments may include other numbers of antenna panels.

Digital beamforming (BF) components 928 may receive an input baseband (BB) signal from, for example, a baseband processor such as, for example, baseband processor 1204A of FIG. 12. The digital BF components 928 may rely on complex weights to pre-code the BB signal and provide a beamformed BB signal to parallel radio frequency (RF) chains 920/1124.

Each RF chain 920/1124 may include a digital-to-analog converter to convert the BB signal into the analog domain; a mixer to mix the baseband signal to an RF signal; and a power amplifier to amplify the RF signal for transmission.

The RF signal may be provided to analog BF components 912/1116, which may apply additionally beamforming by providing phase shifts in the analog domain. The RF signals may then be provided to antenna panels 904/1108 for transmission.

In some embodiments, instead of the hybrid beamforming shown here, the beamforming may be done solely in the digital domain or solely in the analog domain.

In various embodiments, control circuitry, which may reside in a baseband processor, may provide BF weights to the analog/digital BF components to provide a transmit beam at respective antenna panels. These BF weights may be determined by the control circuitry to provide the directional provisioning of the serving cells as described herein. In some embodiments, the BF components and antenna panels may operate together to provide a dynamic phased-array that is capable of directing the beams in the desired direction.

Figure 10:
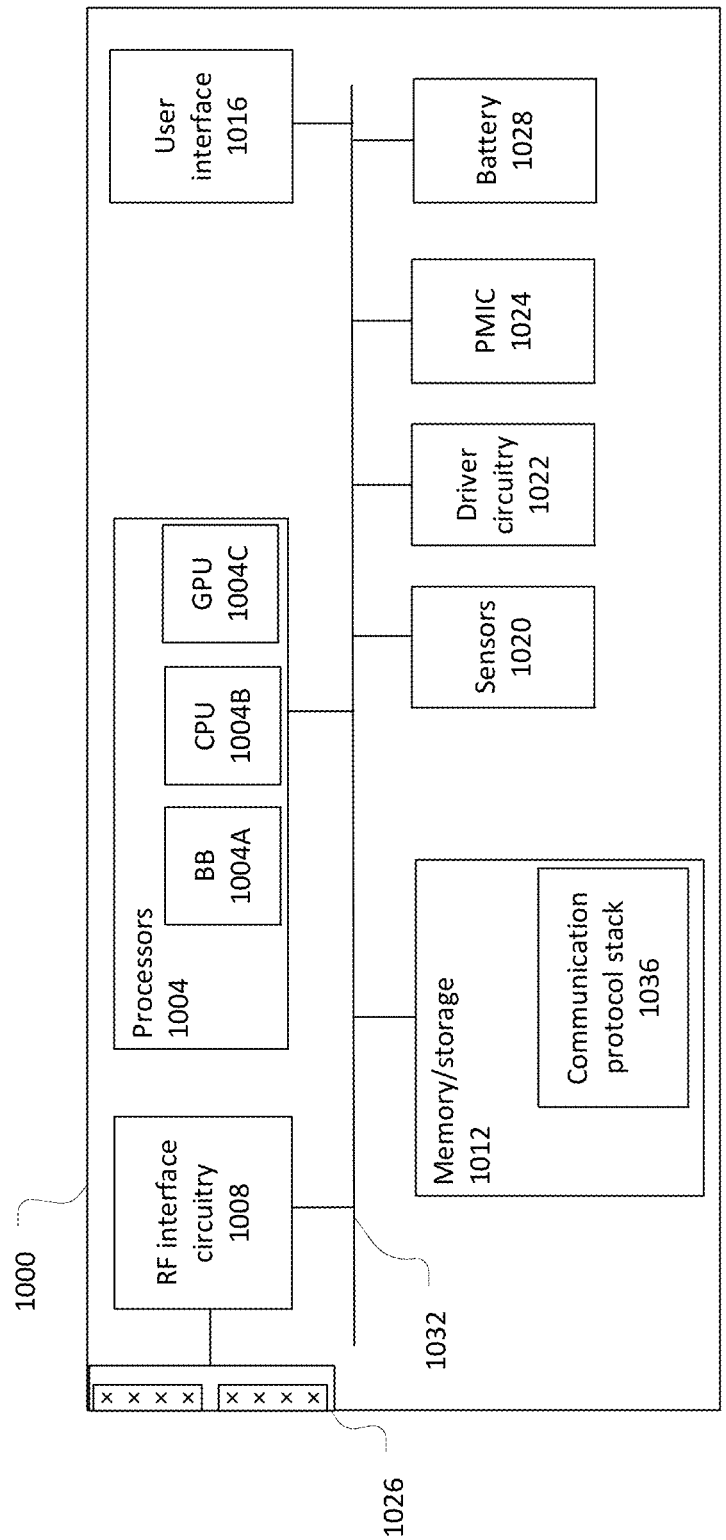
FIG. 10 illustrates a user equipment in accordance with some embodiments.

FIG. 10 illustrates a UE 1000 in accordance with some embodiments. The UE 1000 may be similar to and substantially interchangeable with UE 104 of FIG. 1.

The UE 1000 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices.

The UE 1000 may include processors 1004, RF interface circuitry 1008, memory/storage 1012, user interface 1016, sensors 1020, driver circuitry 1022, power management integrated circuit (PMIC) 1024, antenna structure 1026, and battery 1028. The components of the UE 1000 may be implemented as integrated circuits (ICs), portions thereof, discrete electronic devices, or other modules, logic, hardware, software, firmware, or a combination thereof. The block diagram of FIG. 10 is intended to show a high-level view of some of the components of the UE 1000. However, some of the components shown may be omitted, additional components may be present, and different arrangement of the components shown may occur in other implementations.

The components of the UE 1000 may be coupled with various other components over one or more interconnects 1032, which may represent any type of interface, input/output, bus (local, system, or expansion), transmission line, trace, optical connection, etc. that allows various circuit components (on common or different chips or chipsets) to interact with one another.

The processors 1004 may include processor circuitry such as, for example, baseband processor circuitry (BB) 1004A, central processor unit circuitry (CPU) 1004B, and graphics processor unit circuitry (GPU) 1004C. The processors 1004 may include any type of circuitry or processor circuitry that executes or otherwise operates computer-executable instructions, such as program code, software modules, or functional processes from memory/storage 1012 to cause the UE 1000 to perform operations as described herein.

In some embodiments, the baseband processor circuitry 1004A may access a communication protocol stack 1036 in the memory/storage 1012 to communicate over a 3GPP compatible network. In general, the baseband processor circuitry 1004A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 1008.

The baseband processor circuitry 1004A may generate or process baseband signals or waveforms that carry information in 3GPP-compatible networks. In some embodiments, the waveforms for NR may be based cyclic prefix OFDM "CP-OFDM" in the uplink or downlink, and discrete Fourier transform spread OFDM "DFT-S-OFDM" in the uplink.

The memory/storage 1012 may include one or more non-transitory, computer-readable media that includes instructions (for example, communication protocol stack 1036) that may be executed by one or more of the processors 1004 to cause the UE 1000 to perform various operations described herein. The memory/storage 1012 include any type of volatile or non-volatile memory that may be distributed throughout the UE 1000. In some embodiments, some of the memory/storage 1012 may be located on the processors 1004 themselves (for example, L1 and L2 cache), while other memory/storage 1012 is external to the processors 1004 but accessible thereto via a memory interface. The memory/storage 1012 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 1008 may include transceiver circuitry and radio frequency front module (RFEM) that allows the UE 1000 to communicate with other devices over a radio access network. The RF interface circuitry 1008 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 1026 and proceed to filter and amplify (with a low-noise amplifier) the signal. The signal may be provided to a receiver of the transceiver that down-converts the RF signal into a baseband signal that is provided to the baseband processor of the processors 1004.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1026.

In various embodiments, the RF interface circuitry 1008 may be configured to transmit/receive signals in a manner compatible with NR access technologies.

The antenna 1026 may include antenna elements to convert electrical signals into radio waves to travel through the air and to convert received radio waves into electrical signals. The antenna elements may be arranged into one or more antenna panels. The antenna 1026 may have antenna panels that are omnidirectional, directional, or a combination thereof to enable beamforming and multiple input, multiple output communications. The antenna 1026 may include microstrip antennas, printed antennas fabricated on the surface of one or more printed circuit boards, patch antennas, phased array antennas, etc. The antenna 1026 may have one or more panels designed for specific frequency bands including bands in FR1 or FR2.

The user interface circuitry 1016 includes various input/output (I/O) devices designed to enable user interaction with the UE 1000. The user interface 1016 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays "LCDs," LED displays, quantum dot displays, projectors, etc.), with the output of characters, graphics, multimedia objects, and the like being generated or produced from the operation of the UE 1100.

The sensors 1020 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 1022 may include software and hardware elements that operate to control particular devices that are embedded in the UE 1000, attached to the UE 1100, or otherwise communicatively coupled with the UE 1000. The driver circuitry 1022 may include individual drivers allowing other components to interact with or control various input/output (I/O) devices that may be present within, or connected to, the UE 1000. For example, driver circuitry 1022 may include a display driver to control and allow access to a display device, a touchscreen driver to control and allow access to a touchscreen interface, sensor drivers to obtain sensor readings of sensor circuitry 1020 and control and allow access to sensor circuitry 1020, drivers to obtain actuator positions of electro-mechanic components or control and allow access to the electro-mechanic components, a camera driver to control and allow access to an embedded image capture device, audio drivers to control and allow access to one or more audio devices.

The PMIC 1024 may manage power provided to various components of the UE 1000. In particular, with respect to the processors 1004, the PMIC 1024 may control power-source selection, voltage scaling, battery charging, or DC-to-DC conversion.

In some embodiments, the PMIC 1024 may control, or otherwise be part of, various power saving mechanisms of the UE 1000 including DRX as discussed herein.

A battery 1028 may power the UE 1000, although in some examples the UE 1000 may be mounted deployed in a fixed location, and may have a power supply coupled to an electrical grid. The battery 1028 may be a lithium ion battery, a metal-air battery, such as a zinc-air battery, an aluminum-air battery, a lithium-air battery, and the like. In some implementations, such as in vehicle-based applications, the battery 1028 may be a typical lead-acid automotive battery.

Figure 11:
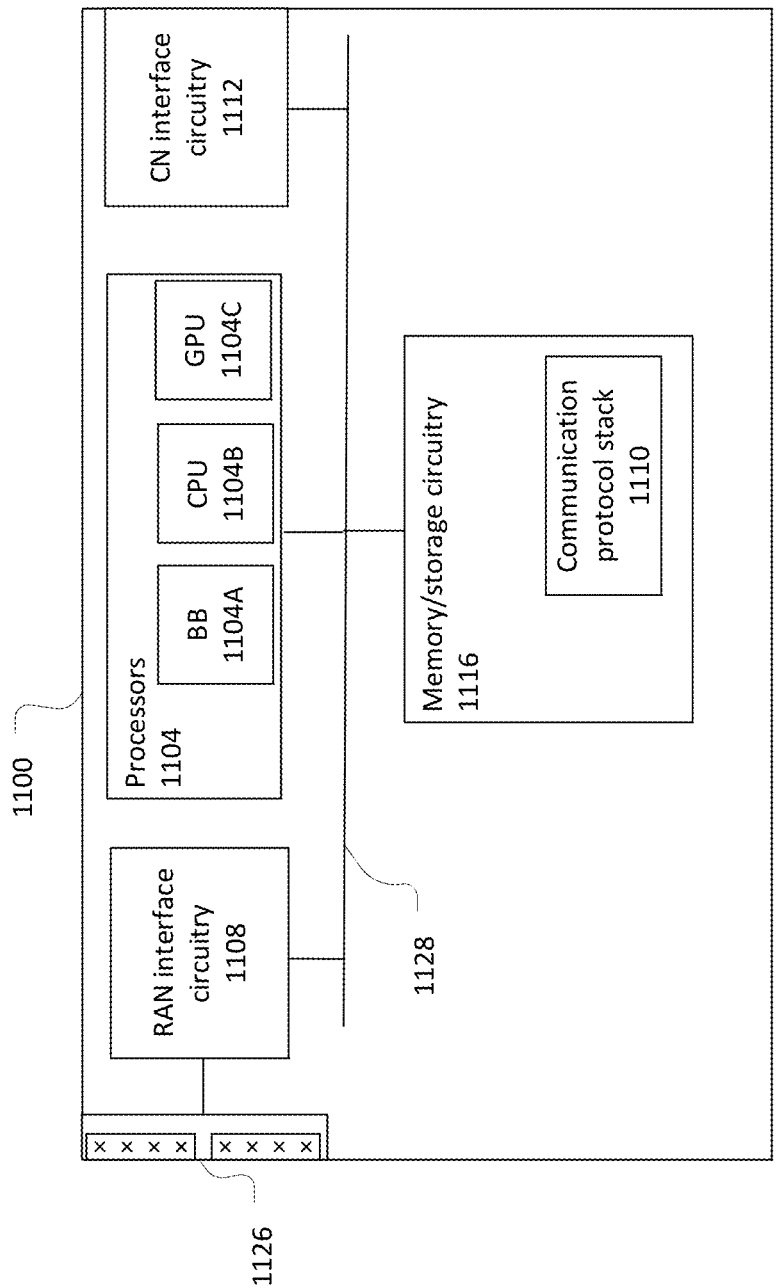
FIG. 11 illustrates a base station in accordance with some embodiments.

FIG. 11 illustrates a gNB 1100 in accordance with some embodiments. The gNB node 1100 may similar to and substantially interchangeable with base station 108 of FIG. 1.

The gNB 1100 may include processors 1104, RF interface circuitry 1108, core network "CN" interface circuitry 1112, memory/storage circuitry 1116, and antenna structure 1126.

The components of the gNB 1100 may be coupled with various other components over one or more interconnects 1128.

The processors 1104, RF interface circuitry 1108, memory/storage circuitry 1116 (including communication protocol stack 1110), antenna structure 1126, and interconnects 1128 may be similar to like-named elements shown and described with respect to FIG. 10.

The CN interface circuitry 1112 may provide connectivity to a core network, for example, a $5^{th}$ Generation Core network "5GC" using a 5GC-compatible network interface protocol such as carrier Ethernet protocols, or some other suitable protocol. Network connectivity may be provided to/from the gNB 1100 via a fiber optic or wireless backhaul. The CN interface circuitry 1112 may include one or more dedicated processors or FPGAs to communicate using one or more of the aforementioned protocols. In some implementations, the CN interface circuitry 1112 may include multiple controllers to provide connectivity to other networks using the same or different protocols.

In some embodiments, the gNB 1100 may be coupled with TRPs, such as TRPs 112 or 116, using the antenna structure 1126, CN interface circuitry, or other interface circuitry.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 may include a method of operating a UE, the method comprising: processing scheduling information to determine a schedule of a physical uplink shared channel (PUSCH) transmission with a plurality of repetitions, wherein the plurality of repetitions include at least two repetition sets to be respectively transmitted with at least two transmit beams; determining a number of phase tracking reference signal (PTRS) ports to be used for transmitting PTRSs associated with each of the at least two repetition sets; transmitting the PUSCH transmission with the plurality of repetitions using the at least two transmit beams; and transmitting the PTRSs by the number of PTRS ports.

Example 2 may include the method of example 1 or some other example herein, further comprising: determining a plurality of PTRS ports are configured; and determining one PTRS port is to be used for transmitting PTRSs associated with each of the first and second repetition sets.

Example 3 may include the method of example 1 or some other example herein, wherein a first number of PTRS ports is initially determined for the first repetition set of the at least two repetition sets, a second number of PTRS ports is initially determined for a second repetition set of the at least two repetition sets, and determining the number of PTRS ports comprises: determining the first number of PTRS ports is to be used for transmitting PTRSs associated with the plurality of repetitions.

Example 4 may include the method of example 3 or some other example herein, wherein an initial number of PTRS ports is determined for each of the at least two repetition sets and the method further comprises: determining the first number of PTRS ports is to be used for transmitting PTRSs associated with the plurality of repetitions based on the first number being a smallest value of the initial numbers of PTRS ports; or determining the first number of PTRS ports is to be used for transmitting PTRSs associated with the plurality of repetitions based on the first number being a largest value of the initial numbers of PTRS ports.

Example 5 may include the method of example 1 or some other example herein, further comprising: determining, for a first repetition set of the at least two repetition sets, an indicated maximum number of PTRS ports from radio resource control (RRC) signaling; determining, for the first repetition set, a codebook subset; determining one or more antenna ports for transmission of the first repetition set; and determining a first number of PTRS ports for transmitting PTRSs associated with the first repetition set based on the indicated maximum number, the codebook subset, and the one or more antenna ports.

Example 6 may include the method of example 5 or some other example herein, further comprising: determining the first number of PTRS ports is one port if the indicated maximum number is one, the codebook subset not configured to be non-coherent or partial coherent, or the one or more antenna ports do not include port 1000 or 1002 and port 1001 or 1003.

Example 7 may include the method of example 5 or some other example herein, further comprising: determining the first number of PTRS ports is two ports if the indicated maximum number is two, the codebook subset is configured to be non-coherent or partial coherent, and the one or more antenna ports include port 1000 or 1002 and port 1001 or 1003.

Example 8 may include a method of operating a UE, the method comprising: storing a phase tracking reference signal (PTRS)-demodulation reference signal (DMRS) association table; receiving one or more downlink control information (DCI) to: schedule a physical uplink shared channel (PUSCH) transmission with a first repetition set that include one or more repetitions that share a first scheduling request indicator (SRI) or transmitted precoding matrix indicator (TPMI) and a second repetition set that include one or more repetitions that share a second SRI/TPMI; and to indicate, in a single field or a plurality of fields, one or more association values; determining, based on the one more association values and the PTRS-DMRS association table, a PTRS-to-DMRS association for the first or second repetition set; transmitting a PTRS based on the PTRS-to-DMRS association; and transmitting the first and second sets of repetitions.

Example 9 may include the method of example 8 or some other example herein, wherein the one or more DCI includes a single two-bit field to indicate the one or more association values and determining the PTRS-to-DMRS association comprises: determining a PTRS port is associated with a first or second scheduled DMRS port, wherein a DMRS port for the first repetition set is the first or second scheduled DMRS port and a DMRS port for the second repetition set is the first or second scheduled DMRS port.

Example 10 may include the method of example 8 or some other example herein, wherein the one or more DCI includes a first field to indicate a first association value of the one or more association values and a second field to indicate a second association value of the one or more association values and, determining the PTRS-to-DMRS association comprises: determining, based on the first association value, a PTRS port that is associated with a DMRS port for the first repetition set; and determining, based on the second association value, a PTRS port that is associated with a DMRS port for the second repetition set.

Example 11 may include the method of example 10 or some other example herein, wherein the PTRS port that is associated with the DMRS port for the first repetition set and the PTRS port that is associated with the DMRS port for the second repetition set are different PTRS ports.

Example 12 may include the method of example 8 or some other example herein, wherein the method further comprises: determining, based on the PTRS-to-DMRS association, a first PTRS port is associated with a first DMRS port for the first repetition set; and transmitting the PTRS via the first PTRS port and a DMRS via the first DMRS port using a common precoder.

Example 13 may include the method of example 8 or some other example herein, wherein the one or more association values includes a first association value and a second association value, the one or more DCI includes first stage DCI to schedule the PUSCH transmission and second stage DCI to include the second association value, and the method further comprises: determining, based on the first association value and the PTRS-DMRS association table, a PTRS-to-DMRS association for the first repetition set; and determining, based on the second association value and the PTRS-DMRS association table, a PTRS-to-DMRS association for the second repetition set.

Example 14 may include the method of example 13 or some other example herein, wherein the second stage DCI comprises a bit width of log 2(ceil(N/M)*M, where M is a number of PTRS ports, and N is a number of transmission layers.

Example 15 may include the method of example 13 or some other example herein, wherein the first association value is in the first stage DCI or the second stage DCI.

Example 16 includes a method comprising: receiving a downlink control information (DCI) to schedule a physical uplink shared channel (PUSCH) transmission with a plurality of repetition sets to be transmitted with at least two transmit beams; determining, based on configuration information that is predefined or received from radio resource control (RRC) or media access control (MAC) control signaling, PTRS-to-DMRS associations for each of the plurality of repetition sets; transmitting a PTRS based on the PTRS-to-DMRS association; and transmitting the PUSCH transmission with the plurality of repetitions.

Example 17 may include the method of example 16 or some other example herein, wherein the configuration information comprises a media access control (MAC) control element (CE).

Example 18 may include the method of example 16 or some other example herein, wherein the PUSCH transmission is associated with N DMRS ports, where N is an integer, and determining the PTRS-to-DMRS association comprises: determining, for each of one or more repetitions of a first repetition set of the plurality of repetition sets, based on a repetition index (k) among the one or more repetitions, a PTRS port is associated with DMRS port k mod N, wherein k=0 for a first repetition of the one or more repetitions and is incremented by one for subsequent repetitions of the one or more repetitions.

Example 19 may include a method of operating a base station, the method comprising: transmitting, to a user equipment, radio resource control (RRC) signaling for a configured grant-physical uplink shared channel (PUSCH) transmission with a plurality of repetition sets, wherein the RRC signaling includes one or more parameters to configure the plurality of repetition sets with a corresponding plurality of PTRS-to-DMRS associations; receiving the CG-PUSCH transmission; receiving PTRSs associated with the CG-PUSCH transmission; and processing the CG-PUSCH transmission based on receiving of the PTRS.

Example 20 may include the method of example 19 or some other example herein, wherein the one or more parameters include a single RRC parameter to jointly indicate the individual repetition sets with PTRS-to-DMRS associations; or a plurality of RRC parameters to respectively indicate.

Example 21 may include an apparatus comprising means to perform one or more elements of a method described in or related to any of examples 1-20, or any other method or process described herein.

Example 22 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 23 may include an apparatus comprising logic, modules, or circuitry to perform one or more elements of a method described in or related to any of examples 1-20, or any other method or process described herein.

Example 24 may include a method, technique, or process as described in or related to any of examples 1-20, or portions or parts thereof.

Example 25 may include an apparatus comprising: one or more processors and one or more computer-readable media comprising instructions that, when executed by the one or more processors, cause the one or more processors to perform the method, techniques, or process as described in or related to any of examples 1-20, or portions thereof.

Example 26 may include a signal as described in or related to any of examples 1-20, or portions or parts thereof.

Example 27 may include a datagram, information element, packet, frame, segment, PDU, or message as described in or related to any of examples 1-20, or portions or parts thereof, or otherwise described in the present disclosure.

Example 28 may include a signal encoded with data as described in or related to any of examples 1-20, or portions or parts thereof, or otherwise described in the present disclosure.

Example 29 may include a signal encoded with a datagram, IE, packet, frame, segment, PDU, or message as described in or related to any of examples 1-20, or portions or parts thereof, or otherwise described in the present disclosure.

Example 30 may include an electromagnetic signal carrying computer-readable instructions, wherein execution of the computer-readable instructions by one or more processors is to cause the one or more processors to perform the method, techniques, or process as described in or related to any of examples 1-20, or portions thereof.

Example 31 may include a computer program comprising instructions, wherein execution of the program by a processing element is to cause the processing element to carry out the method, techniques, or process as described in or related to any of examples 1-20, or portions thereof.

Example 32 may include a signal in a wireless network as shown and described herein.

Example 33 may include a method of communicating in a wireless network as shown and described herein.

Example 34 may include a system for providing wireless communication as shown and described herein.

Example 35 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed.

Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory computer-readable media having instructions that, when executed by one or more processors, cause an apparatus to:
process scheduling information to determine a schedule of a physical uplink shared channel (PUSCH) transmission with a plurality of repetitions, wherein the plurality of repetitions include at least two repetition sets to be respectively transmitted with at least two transmit beams;
determine a number of phase tracking reference signal (PTRS) ports to be used for transmitting PTRSs associated with each of the at least two repetition sets;
cause the PUSCH transmission to be transmitted with the plurality of repetitions using the at least two transmit beams; and
cause the PTRSs to be transmitted by the number of PTRS ports.

2. The one or more non-transitory computer-readable media of claim 1, wherein to determine the number of PTRS ports, the instructions, when executed, further cause the apparatus to:
determine a plurality of PTRS ports are configured; and
determine one PTRS port is to be used for transmitting PTRSs associated with each of the at least two repetition sets.

3. The one or more non-transitory computer-readable media of claim 1, wherein a first number of PTRS ports is initially determined for a first repetition set of the at least two repetition sets, a second number of PTRS ports is initially determined for a second repetition set of the at least two repetition sets, and to determine the number of PTRS ports the instructions are further to cause the apparatus to:
determine the first number of PTRS ports is to be used for transmitting PTRSs associated with the plurality of repetitions.

4. The one or more non-transitory computer-readable media of claim 3, wherein an initial number of PTRS ports is determined for each of the at least two repetition sets and the instructions, when executed, further cause the apparatus to:
determine the first number of PTRS ports is to be used for transmitting PTRSs associated with the plurality of repetitions based on the first number being a smallest value of the initial numbers of PTRS ports; or
determine the first number of PTRS ports is to be used for transmitting PTRSs associated with the plurality of repetitions based on the first number being a largest value of the initial numbers of PTRS ports.

5. The one or more non-transitory computer-readable media of claim 1, wherein the instructions, when executed, further cause the apparatus to:
determine, for a first repetition set of the at least two repetition sets, an indicated maximum number of PTRS ports from radio resource control (RRC) signaling;
determine, for the first repetition set, a codebook subset;
determine one or more antenna ports for transmission of the first repetition set; and
determine a first number of PTRS ports for transmitting PTRSs associated with the first repetition set based on the indicated maximum number, the codebook subset, and the one or more antenna ports.

6. The one or more non-transitory computer-readable media of claim 5, wherein the instructions, when executed, further cause the apparatus to: determine the first number of PTRS ports is one port if the indicated maximum number is one, the codebook subset is not configured to be non-coherent or partial coherent, or the one or more antenna ports do not include port 1000 or 1002 and port 1001 or 1003.

7. The one or more non-transitory computer-readable media of claim 5, wherein the instructions, when executed, further cause the apparatus to: determine the first number of PTRS ports is two ports if the indicated maximum number is two, the codebook subset is configured to be non-coherent or partial coherent, and the one or more antenna ports include port 1000 or 1002 and port 1001 or 1003.

8. The one or more non-transitory computer-readable media of claim 1, wherein the instructions, when executed, further cause the apparatus to:
determine, based on radio resource control (RRC) signaling, an indicated maximum number of PTRS ports across all of the plurality of repetitions.

9. An apparatus comprising:
memory to store a phase tracking reference signal (PTRS)-demodulation reference signal (DMRS) association table; and
processing circuitry coupled with the memory, the processing circuitry to:
process one or more downlink control information (DCI) to: schedule a physical uplink shared channel (PUSCH) transmission with a first repetition set that include one or more repetitions that share a first scheduling request indicator (SRI) or transmitted precoding matrix indicator (TPMI) and a second repetition set that include one or more repetitions that share a second SRI/TPMI; and to indicate, in a single field or a plurality of fields, one or more association values;
determine, based on the one more association values and the PTRS-DMRS association table, a PTRS-to-DMRS association for the first repetition set or the second repetition set;
cause a PTRS to be transmitted based on the PTRS-to-DMRS association; and
cause the first repetition set and the second repetition set to be transmitted.

10. The apparatus of claim 9, wherein the one or more DCI includes a single two-bit field to indicate the one or more association values and, to determine the PTRS-to-DMRS association, the processing circuitry is to determine:
a PTRS port is associated with a first or second scheduled DMRS port, wherein a DMRS port for the first repetition set is the first or second scheduled DMRS port and a DMRS port for the second repetition set is the first or second scheduled DMRS port.

11. The apparatus of claim 9, wherein the one or more DCI includes a first field to indicate a first association value of the one or more association values and a second field to indicate a second association value of the one or more association values and, to determine the PTRS-to-DMRS association, the processing circuitry is to:
determine, based on the first association value, a PTRS port that is associated with a DMRS port for the first repetition set; and determine, based on the second association value, a PTRS port that is associated with a DMRS port for the second repetition set.

12. The apparatus of claim 11, wherein the PTRS port that is associated with the DMRS port for the first repetition set and the PTRS port that is associated with the DMRS port for the second repetition set are different PTRS ports.

13. The apparatus of claim 9, wherein the processing circuitry is further to:
  determine, based on the PTRS-to-DMRS association, a first PTRS port is associated with a first DMRS port for the first repetition set; and
  transmit the PTRS via the first PTRS port and a DMRS via the first DMRS port using a common precoder.

14. The apparatus of claim 9, wherein the one or more association values includes a first association value and a second association value, the one or more DCI includes a first stage DCI to schedule the PUSCH transmission and a second stage DCI to include the second association value, and the processing circuitry is further to:
  determine, based on the first association value and the PTRS-DMRS association table, a PTRS-to-DMRS association for the first repetition set; and
  determine, based on the second association value and the PTRS-DMRS association table, a PTRS-to-DMRS association for the second repetition set.

15. The apparatus of claim 14, wherein the second stage DCI comprises a bit width of log 2(ceil(N/M)*M, where M is a number of PTRS ports, and N is a number of transmission layers.

16. The apparatus of claim 14, wherein the first association value is in the first stage DCI or the second stage DCI.

17. A method of comprising:
  transmitting, to a user equipment, radio resource control (RRC) signaling for a configured grant-physical uplink shared channel (CG-PUSCH) transmission with a plurality of repetition sets, wherein the RRC signaling includes one or more parameters to configure the plurality of repetition sets with a corresponding plurality of phase tracking reference signal PTRS-to-demodulation reference signal (DMRS associations;
  receiving the CG-PUSCH transmission;
  receiving PTRSs associated with the CG-PUSCH transmission; and
  processing the CG-PUSCH transmission based on receiving of the PTRSs associated with the CG-PUSCH transmission.

18. The method of claim 17, wherein the one or more parameters include a single RRC parameter.

* * * * *